United States Patent [19]

Stieber et al.

[11] Patent Number: 4,576,246
[45] Date of Patent: Mar. 18, 1986

[54] METHOD AND DEVICE FOR AUTOMATICALLY STEERING A VEHICLE

[75] Inventors: Michael Stieber, Weston, Canada; Peter Meinke, Steinebach; Gunther Dreher, Munich, both of Fed. Rep. of Germany

[73] Assignee: M.A.N. Maschinenfabrik Augsburg-Nurnberg AG, Munich, Fed. Rep. of Germany

[21] Appl. No.: 687,193

[22] Filed: Dec. 28, 1984

Related U.S. Application Data

[63] Continuation of Ser. No. 320,785, Nov. 12, 1981, abandoned.

[30] Foreign Application Priority Data

Nov. 13, 1980 [DE] Fed. Rep. of Germany ....... 3042723

[51] Int. Cl.$^4$ .............................................. G05D 1/00
[52] U.S. Cl. ..................................... 180/168; 318/587
[58] Field of Search ...................... 180/168, 167, 169; 318/587

[56] References Cited

U.S. PATENT DOCUMENTS 4,088,939  5/1978  Mitschke ............................ 180/168
4,307,329  12/1981  Taylor ................................ 180/168
4,310,789  1/1982  Mank et al. ........................ 180/168

Primary Examiner—David M. Mitchell
Attorney, Agent, or Firm—Alan H. Levine

[57] ABSTRACT

A method and device for automatically steering a trackless vehicle along a routing or guide line. A scanner senses the position of the longitudinal centerline of the vehicle with respect to the guide line and produces a position signal. A datum transmitter produces a datum signal. A comparator compares the two signals and produces a difference signal which is used by a control unit to produce a steering signal. In producing the steering signal, the device distinguishes between influences on the vehicle position caused by interference, e.g., wind gusts and rough roads, and influences caused by curvature of the guide line. The steering signal causes adjustment of the steering angle of the vehicle to minimize the distance between a reference point on the longitudinal centerline of the vehicle and the guide line.

7 Claims, 2 Drawing Figures

METHOD AND DEVICE FOR AUTOMATICALLY STEERING A VEHICLE

This application is a continuation of application Ser. No. 320,785, filed Nov. 12, 1981 now abandoned.

This invention relates to a method and a device for automatically steering a trackless vehicle along a routing or guide line using at least one scanning element to sense the relative position between the longitudinal centerline of the vehicle and the guide line. In addition, a control means is used which, via a steering signal, affects the steering angle of the vehicle such that the distance of a reference point on the longitudinal centerline of the vehicle from the guide line is minimized.

Such devices can be used, e.g., in local traffic to reduce the public demand for special bus roadways. The vehicle is guided automatically along a guide wire in the roadbed, the scanning element sensing any deviation of the vehicle from the guide line and the steering control compensating for any such deviation. The deviation may be caused by interference, such as wind gusts, rough roads, guide line field distortions, or curvature of the guide lines, the latter playing a significant role in the design of the control systems.

German Patent Specification DE-OS No. 18 01 967 discloses a device in which the steering signal is determined directly from the summation of two distances measured by scanning elements and the momentary steering angle such that the vehicle will turn back towards a straight guide line whenever it has deviated from it. When the guide line is curved, however, the correction is not entirely satisfactory and possible only at relatively low vehicle speeds.

German Patent Specification DE-OS No. 25 21 571 discloses a device, intended to improve the accuracy with which the vehicle follows curved guide lines especially at greater speeds, wherein a third scanning element is used to determine the radius of curvature of the guide line and the parameters of the control unit are variable as a function of the curvature. With the aid of the radius a steering angle datum is formed and entered into the control signal.

It has been shown, however, that such improved accuracy compromises the riding properties of the vehicle.

It is a broad object of the present invention to provide a method of the type described for guiding vehicles with great accuracy and a great degree of riding comfort.

It is a particular object of the present invention to provide an arrangement wherein, when the steering signal is being formed, differentiation is made between the effects produced by interference and those caused by the curvature of the guide line. This enables the vehicle to be steered in response to separate deviations caused by interference or curvature, permitting gentle restoring movements to be achieved with a minimum of deviation of the reference point from the guide line, even at high speeds and in any situation. As a result, the vehicle will negotiate any type of bend in the roadway with a high degree of accuracy and comfort.

With other known devices of the kind described, it has been impossible to date to distinguish whether a deviation from the guide line was caused by interference or by a change in the curvature of the roadway. The control system, therefore, was necessarily designed to suit the changes in curvature and so produced jerky steering movements when interference effects were corrected.

According to a preferred feature of the present invention, the curvature effects are processed to form datum variables used in the operation of the steering system.

According to a further feature of the present invention, the interference and curvature effects, respectively, are used to form separate steering signals $w_z$ and $w_k$, which are then added together to form a total steering signal w. This enables the vehicle to be steered in response to separate deviations caused by interference or curvature, permitting gentle restoring movements to be achieved with a minimum of deviation of the reference point from the guide line, even at high speeds and in any situation. As a result, the vehicle will negotiate any type of bend in the roadway with a high degree of accuracy and comfort.

With other known devices of the described kind, it has been impossible to date to distinguish whether a deviation from the guide line was caused by interference or by a change in the curvature of the roadway. The control system, therefore, was necessarily designed to suit the changes in curvature and so produced jerky steering movements when interference effects were corrected.

According to a preferred feature of the present invention, the curvature effects are processed to form datum variables used in the operation of the steering system.

According to a further feature of the present invention, the interference and curvature effects, respectively, are used to form separate steering signals $w_z$ and $w_k$, which are then added together to form a total steering signal w.

The datum signals are preferably formed such that they are similar to the actual datum signals which would occur in the undisturbed case wherein the vehicle is ideally routed along the guide track, i.e., in the case of ideal guidance, where steering action would be required only to follow the course of the guide line. In this arrangement it is possible to generate the datum values by means of a filter responsive to the curvature of the guide line and by other quantities, such as vehicle speed and load and environmental data, with no disturbance whatever, such as field distortions in the magnetic field of the guide wire, wind gusts, etc., being taken into account. With the aid of the filter, the datum values can be generated for the interference-caused signal and concurrently for the curvature-caused steering signal, in the case of two separate steering signals and under the same conditions.

According to a further feature of the present invention, the datum values and, if desirable, the guidance-related steering signal are obtained by calculation, i.e., with no knowledge of the curvature. In cases such as these, the calculation is advantageously made on the basis of actual values, where conditions for the datum values, such as the position of the vehicle, the reference point arrangement, and the steering angle setting, are taken into account as well. The controlling quantities characterizing the course of the guide line can be fed to the control device in advance, or can be measured en route.

According to a further feature of the present invention, the difference between the measured signals and the calculated signals and the datum signals is processed to form a steering signal, or an interference steering signal. Knowledge of movement of the vehicle in the undisturbed condition enables the measured signals to be compared with the datum of the undisturbed condition to derive corrective control. For this purpose, an interference steering signal is formed by means of a control law designed for maximum comfort to influence the steering system in cooperation with the guidance signal.

To strike an optimum balance between the conflicting requirements for accurate guidance on the one hand and for adequate riding comfort on the other, the interference steering signal is used to motivate the vehicle approximately such that the quality criterion $$I = \int_0^\infty (ay^2 + \dot{\beta}_z^2)$$

dt is minimized, where a is a speed-sensitive weighting factor, y the deviation of the reference point from the guide line, and $\dot{\beta}_z$ the interference steering rate.

Apart from accurate guidance and good riding comfort, the present invention provides another benefit especially on account of the variable datum value, in that the position of the reference point and of the scanning elements can be freely selected independently of one another. With the systems known to date, it is necessary that a scanning element coincide with the reference point, i.e., with that point on the longitudinal centerline of the vehicle the distance of which from the guide wire should be a minimum so that this distance requirement can be met also in the bends of the guide line, where the longitudinal centerline of the vehicle and the guide line are no longer parallel. In contrast with the previous requirement for constant distance datums of the scanning elements, the present invention provides a method using variable datum values or setpoints considering the curvature-caused deviations from zero distance when the scanning element does not lie at the reference point forming the point of intersection between the longitudinal centerline of the vehicle and the curve.

The fact that the position of the scanning elements is independent of the reference point widens the spectrum of conditions that can be considered in the analysis of the position. It will be possible, e.g., to reduce the measuring error by placing the reference point between two scanning elements. Also, the reference points can be placed at the front axle, which enables the width of roadway to be optimized for a guide line used in both directions of travel.

Separation of the curvature-caused control signals from the interference control makes for a simpler and especially a safer control unit. Compared with control units used with conventional systems, the control unit of this invention is less sensitive to parameters in that after elimination of the curvature-caused signals the control unit will have only weak interference signals left to process.

An embodiment of the present invention is described more fully in light of the accompanying drawings, wherein the guide line is formed by an AC conductor, the field of which is inductively scanned by antennas. In the drawings.

Figure 1:
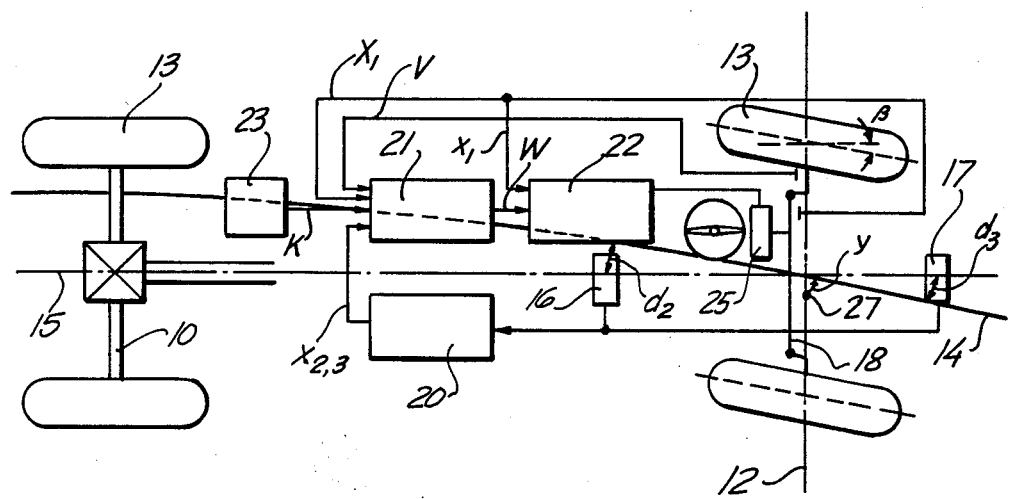
FIG. 1 is a general schematic view of the invention.

A vehicle having rear and front axles 10 and 12 respectively, plus associated wheels 13, is guided along a guide line 14 which takes the form of a guide or routing wire.

The field of the guide cable is detected by two antennas 16 and 17 arranged on the longitudinal centerline 15 of the vehicle. The antenna signals are routed to a control unit comprising electronic sensor circuitry 20, a steering control 21, an actuating control 22, and a curvature transmitter 23. The electronic sensor circuitry 20 senses from the antenna signals, the distances $d_2$ and $d_3$ of the antennas to the guide line 14. The distance signals, together with a speed signal v, a curvature signal k from the curvature transmitter, and a signal $x_1$ corresponding to the steering angle $\beta$ as measured inductively at the track rod 18, are processed in the steering control 21 to form a steering signal w which is routed to the actuating control 22. The actuating control 22 operates a hydraulic actuator 25 which moves the front wheels 13 and verifies their position via feedback of the actual steering angle $\beta$. In the process, the vehicle is steered such that a selected reference point 27 on the front axle 12 will, throughout the travel of the vehicle, maintain a minimum distance y to the guide line 14. For the electronic sensor circuitry 20 and the actuating control 22, use can be made of conventional wiring arrangements.

Figure 2:
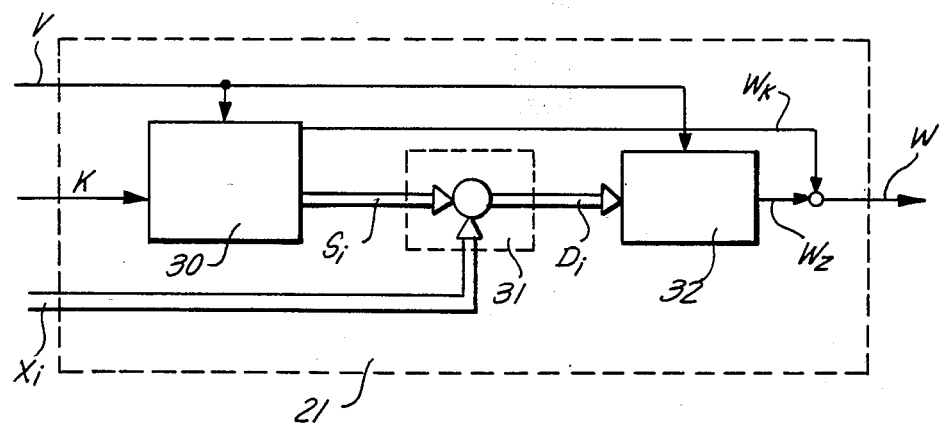
FIG. 2 is a schematic view of the steering control portion of FIG. 1.

The steering control 21, which in FIG. 2 is illustrated in more detail in the form of a block diagram, consists of a datum transmitter 30, a comparator circuit 31, and a control unit 32. The curvature k of the guide line 14 is determined conventionally from measurable variables using, e.g., a device disclosed by German Patent Specification DE-OS No. 25 21 571, corresponding to U.S. Pat. No. 4,088,939.

The curvature k is routed to the datum transmitter 30, which uses a filter to generate the datum values or signals s for all measurable variables, and a curvature-sensitive steering signal $w_k$. The filter represents certain properties of the vehicle and is attuned to the speed v at the moment. The reference point 27 can be set at random, i.e., independently of the position of the antenna 16 or 17, by means of adjusting provisions on the filter. If the factors are allowed to vary with the weather or the vehicle load, the changes in the performances of the vehicle under the effects of load or weather can be compensated for to provide highly accurate guidance close to the reference point irrespective of load or weather.

The datum signals s are routed to the comparator circuit 31, which determines the difference caused by interference between the datum values and the actual values $x_i$. These different signals $D_i$, now under the effect of no factors other than interferences, are then processed in the control unit 32 to form an interference-sensitive signal $w_z$.

Addition of the curvature-sensitive steering signal $w_k$, together with the interference-sensitive steering signal $w_z$, produces the total steering signal w which in conjunction with the momentary speed v drives the actuator 25 through the actuating control 22.

The control unit 32 is designed as an optimum control based on an optimizing criterion in the form of:

$$I = \int_0^\infty (a(v)\, y^2(t) + \dot{\beta}_z^2(t))dt, \text{ where:}$$

y = horizontal distance of the reference point to the guide wire a = speed-sensitive weighting factor
t = time
$\beta_z$ = steering rate based on interference-sensitive steering signals, which is to be minimized with the intended interference behavior.

The control law of the optimum control unit 32 provides, for all input signals $D_i$, speed-sensitive amplification factors $P_i$ which by means of an arithmetic circuit are approximated by polynomials. This permits the simple and fast adjustment of speed sensitivities.

Optionally, the interference-sensitive and the curvature-sensitive effects can be processed in the datum transmitter 30 to merely form datum signals $s_i$ used to produce, through the comparator circuit 31 and the control unit 32, a steering signal solely responsible for corrective action. In this case, separate curvature-sensitive steering signal $w_k$ is omitted, such that the signals $w_z$ and w indicated in FIG. 2 are equal.

This invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A method for automatically steering a trackless vehicle along a routing or guide line, comprising the steps of:
   sensing the distance between a reference point on the vehicle and the guide line, and producing a position signal representative thereof, the position signal being affected by interference encountered by the vehicle, such as disturbances caused by winds and rough roads,
   producing a datum signal corresponding to the position signal which would be produced if the vehicle traveled in an undisturbed manner along the guide line,
   producing a curvature-sensitive steering signal component which varies only with the shape of the guide line,
   using the position signal and datum signal to produce an interference-sensitive steering signal component which varies only with the interference encountered by the vehicle,
   combining the curvature-sensitive steering signal component and the interference-sensitive steering signal component to produce a steering signal, and
   using the steering signal to control the steering of the vehicle so as to minimize the distance between the reference point on the vehicle and the guide line.

2. A method as defined in claim 1 wherein the datum signal values are calculated.

3. A method as defined in claim 1 wherein the curvature-sensitive steering signal component values are calculated.

4. A method as defined in claim 1 wherein the interference-sensitive steering component influences the steering of the vehicle such that the quality criterion $$I = \int_0^\infty (ay^2 + \dot{\beta}_z^2)dt$$

is minimized, a being a speed-sensitive weighting factor, y being the deviation of the reference point from the guide line, and $\dot{\beta}_z$ being the interference steering rate.

5. A device for automatically steering a trackless vehicle along a routing or guide line, comprising:
   scanning means for sensing the distance between a reference point on the vehicle and the guide line, and producing a position signal representative thereof, the position signal being affected by interference encountered by the vehicle, such as disturbances caused by winds and rough roads,
   a datum transmitter for producing a datum signal corresponding to the position signal which would be produced if the vehicle traveled in an undisturbed manner along the guide line, and for producing a curvature-sensitive steering signal component which varies only with the shape of the guide line,
   a comparator for comparing the position signal and the datum signal and producing a difference signal,
   control means for receiving the difference signal and producing an interference-sensitive steering signal component which varies only with the interference encountered by the vehicle,
   means for combining the curvature-sensitive steering signal component and the interference-sensitive steering signal component to produce a steering signal, and
   means responsive to the steering signal for adjusting the steering angle of the vehicle to minimize the distance between the reference point on the vehicle and the guide line.

6. A device as defined in claim 5 wherein the reference point is located on the front axle of the vehicle.

7. A device as defined in claim 5 including a filter within the datum transmitter.

* * * * *